No. 719,846. PATENTED FEB. 3, 1903.
A. L. NEUBERT & S. T. WIEDENBECK.
ATTACHMENT FOR BOTTLE FILLERS.
APPLICATION FILED DEC. 1, 1900.
NO MODEL. 2 SHEETS—SHEET 1.
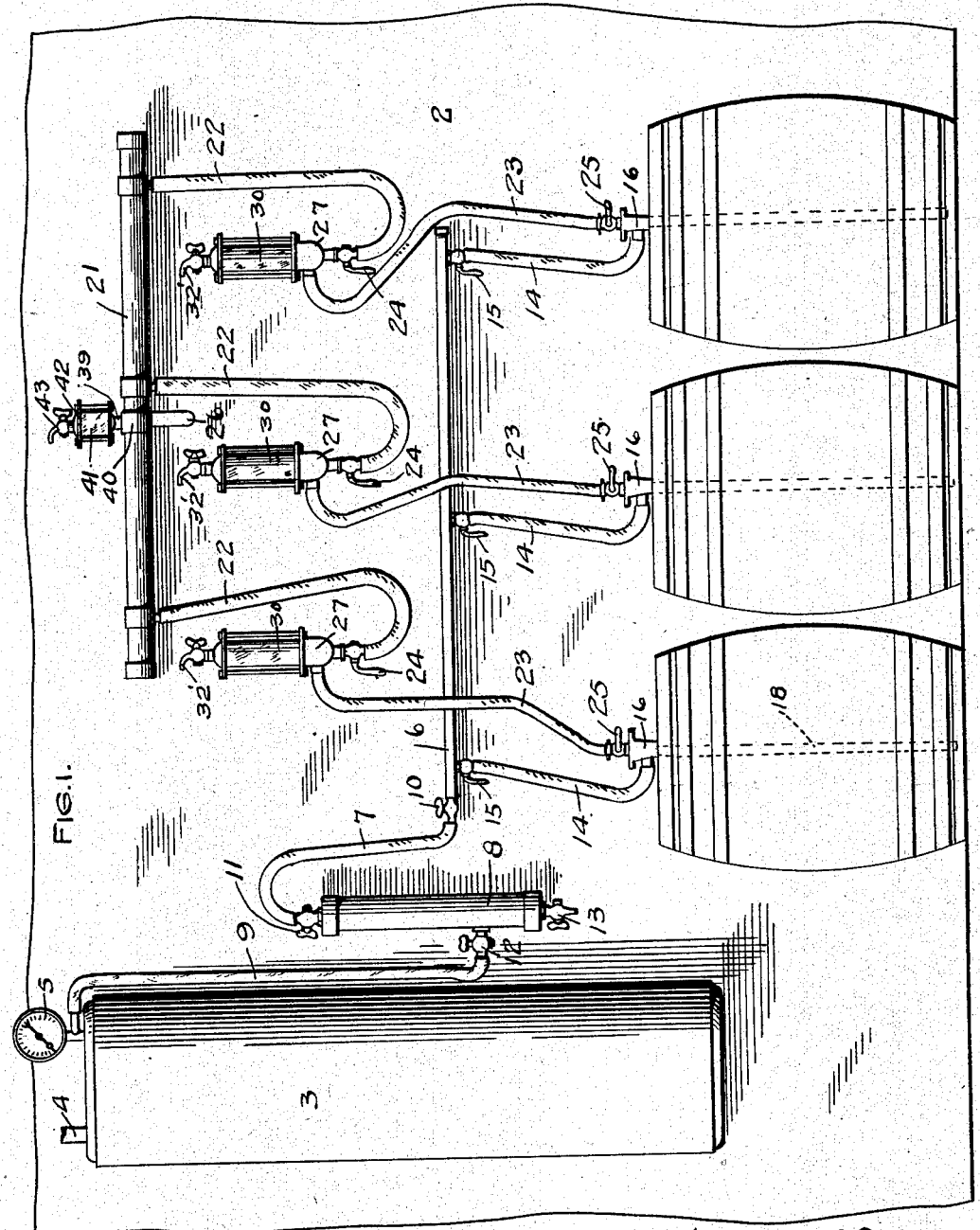
WITNESSES
INVENTORS
ARMIN L. NEUBERT
SIEGMUND T. WIEDENBECK
BY Paul Hawley
THEIR ATTORNEYS

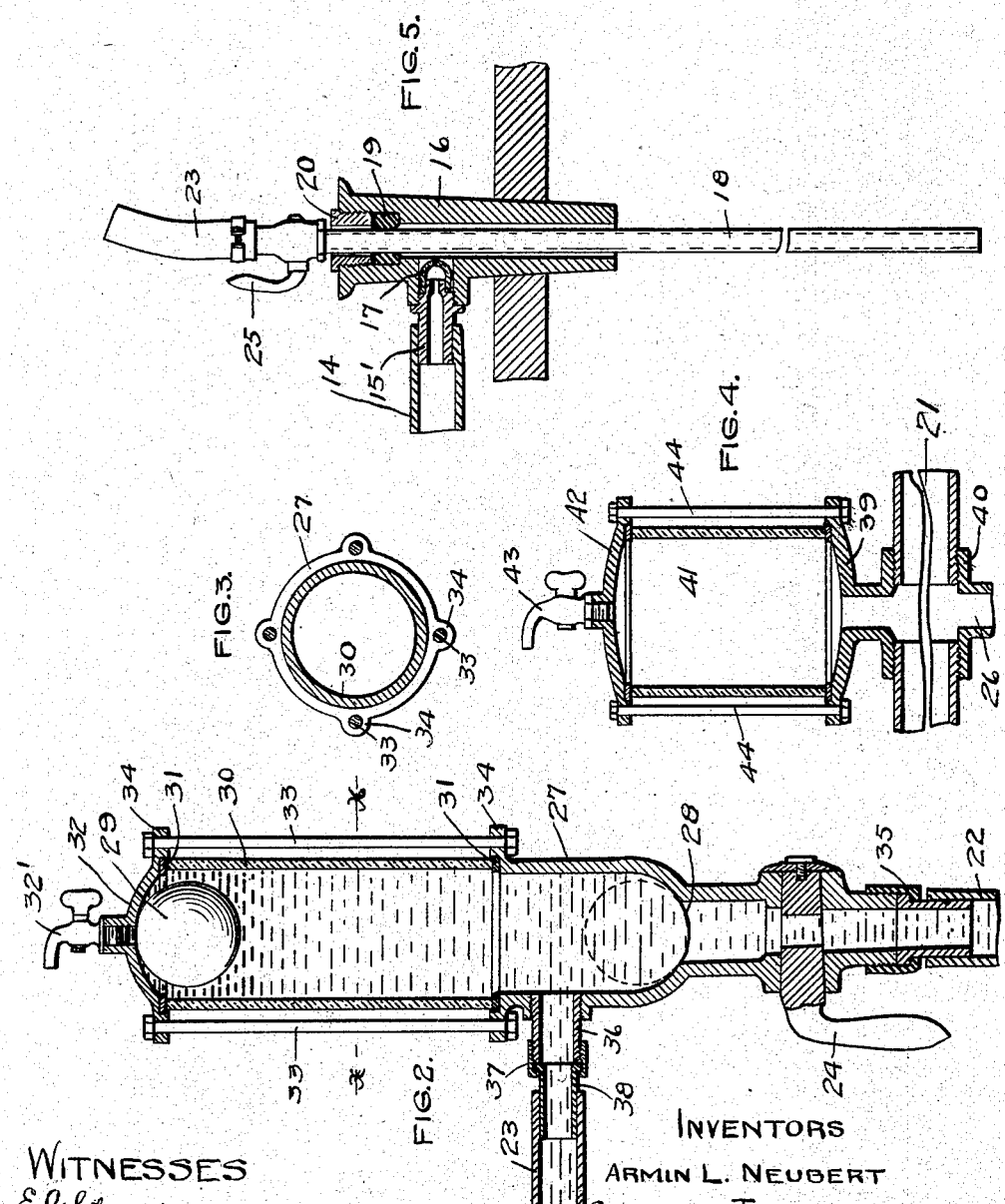

ARMIN L. NEUBERT AND SIEGMUND T. WIEDENBECK, OF MINNEAPOLIS, MINNESOTA.

ATTACHMENT FOR BOTTLE-FILLERS.

SPECIFICATION forming part of Letters Patent No. 719,846, dated February 3, 1903.

Application filed December 1, 1900. Serial No. 38,305. (No model.)

*To all whom it may concern:*

Be it known that we, ARMIN L. NEUBERT and SIEGMUND T. WIEDENBECK, of Minneapolis, Hennepin county, Minnesota, have invented certain new and useful Improvements in Attachments for Bottle-Fillers, of which the following is a specification.

The invention relates to attachments for bottle-fillers. In bottling beer it has been customary to arrange the kegs or packages near the filler and deliver the beer thereto by gravity or under air-pressure. If the latter method was employed, the air would rush into the filler and cause foaming of the beer and consequent loss of its effervescible qualities and flavor unless the air was shut off the moment the keg became empty, and this was especially true if several kegs were being emptied at the same time.
The primary object, therefore, of our invention is to provide means for automatically closing the passage leading to the filler the instant the keg connected therewith becomes empty.
A further object is to reduce the temperature of the beer to prevent it from becoming flat and stale during the filling operation.

The invention consists generally in interposing a valve between the filler and a filled keg that is adapted to automatically close the passage leading to the filler as soon as the keg or package is emptied of its contents.

Further, the invention consists in various constructions and combinations, all as hereinafter described, and particularly pointed out in the claim.

In the accompanying drawings, forming part of this specification, Figure 1 is an elevation of the wall of an ice-box with our invention attached thereto. Fig. 2 is a vertical section of the valved trap and its connections. Fig. 3 is a sectional view on the line $x$ $x$ of Fig. 2. Fig. 4 is a vertical section of the observing-glass in the filler-reservoir. Fig. 5 is a vertical section of the keg-bung, showing the attachments thereto.

In the drawings, 2 represents the inner wall of an ice-box, and 3 an air-tank having an inlet-pipe 4 and gage 5 whereon the pressure in the tank is registered.

6 represents the main air-pipe, supported horizontally on or near the wall 2 and closed at one end and having a pipe 7 at the other that communicates through a drip-pipe 8 and an air-pipe 9 with the top of the tank 3. We prefer to provide valves 10 and 11 in the pipe 7 and a valve 12 in the pipe 9 at the point where it enters the drip-pipe. We also provide a small cock 13 in the lower end of the drip-pipe to permit the operator to drain the water of condensation from the pipes.

The air-pipe 6 is provided with branch tubes 14, leading downwardly therefrom. There may be any desired number of these tubes, according to the length of the air-pipe, and each tube is provided with a valve 15 near the point where it is connected to the pipe 6. The lower ends of the pipes 14 are adapted to fit over nipples 15', whose threaded inner ends are adapted to enter sockets provided in the walls of bungs 16, that are thrust into holes in the heads of the kegs. A flexible valve or cap 17 is provided on the inner ends of each of the nipples 15' and while permitting the air to pass freely into the keg through the bung will prevent the beer from flowing up into the air-pipes. Within each bung 16 is a draft rod or tube 18, adapted to extend to a point near the bottom of the keg and having openings in its lower end through which the beer flows up through the tube. A flexible washer or gasket 19 is provided near the top of the bung, inclosing the draft-tube, and a threaded plug 20 is provided in the bung above the gasket and adapted to press or crowd the same against the walls of the tube and prevent leakage of air.

The bung as described above is substantially the same as the one in common use in breweries, and we make no claim, broadly, to it in this application.

Above the main air-pipe 6 we provide a filler-reservoir 21, having closed ends and provided at intervals with pipes 22, that communicate through pipes 23 with the upper ends of the draft-tubes 18. We prefer to provide a valve 24 in each of the pipes 22 and a valve 25 in the lower end of each of the pipes 23. The number of pipes 22 and 23 correspond, of course, to the number of keg-bungs and branch air-pipes leading thereto. From the reservoir 21 a pipe 26 extends through the wall 2 to the filler on the outside, which may be of the ordinary siphonic type.

When the valves are opened and air is admitted to a keg, it will fill the space in the top of the same above the beer, and the pressure will force the beer from the bottom up through the draft-tube and the pipe connected therewith to the filler-reservoir, and from thence it will flow by gravity down to the filler. This operation will continue until the keg is emptied of its contents; but at that time, unless the attendant shuts the valves, the air will flow through the pipes and into the filler, cause foaming of the beer, and the consequent loss of its gas and flavor. As a number of kegs are being emptied simultaneously and as the attendant has no means of ascertaining how fast the beer is flowing from a keg or what quantity remains therein, we provide means for automatically closing the passage leading from each keg to the filler, so that the instant a keg is emptied of its contents the passage will be closed and the air in that keg prevented from entering the filler or its reservoir. This means consists, preferably, of a trap 27, provided between each of the pipes 22 and 23 and having a valve-seat 28 to receive a ball or floating valve 29, that is vertically movable within said trap and the gage or observing-glass 30, provided above the same. Gaskets 31 are provided between the lower end of said glass and the top of the trap and between a cap 32 and the top of the glass 30, said cap being held in place by rods 33, connecting said cap with lugs 34 at the top of the trap. Each cap is provided with a cock 32'. The lower end of said trap is preferably threaded to receive an interiorly-threaded nipple 35, to which the pipe 22 is connected. A nipple 36 is provided in the wall of the trap above the valve 28, and a cap 37 at the outer end of the nipple 36 supports a flanged nipple 38, to which the tube 23 is attached. This connection with the walls of the trap is made, preferably, at a point above the level of the ball-valve when it is resting upon the valve-seat 28. On the top of the reservoir 21 we prefer to provide a cup 39, connected with a threaded sleeve 40, arranged on said reservoir, from the under side of which the pipe 26 preferably extends to the filler. The glass 41 is mounted on the cup 39 and provided with a cap 42, having a cock 43, said cap being held in position by rods 44. By means of this reservoir-glass the attendant can detect any foaming of the beer in the filler and may release the air by opening the cock 43.

The operation of the device is as follows: The operator or attendant having thrust one of the bungs into a filled keg of beer opens the valves 15 and 24, and the air-pressure rushing into the keg from the tank 3 will force the beer up through the pipes into the filler-reservoir. As the beer rushes through the pipes 23 it will drive the air therein up into the glass 30, and when the beer flows into the glass it will foam and be filled with air-bubbles until the attendant opens the cock 32' and allows the air to escape and the beer to run clear. When the beer flows into the trap, the float-valve will be upon its seat, closing the passage leading to the filler. As soon, however, as the trap and glass are filled with beer the valve will rise to the top of the glass, as indicated by full lines in Fig. 2, and will remain in this position until the keg is emptied of its contents, allowing the beer to flow into the filler. As soon, however, as all the beer has all passed out of the keg and the glass the valve will drop down to the position indicated by dotted lines in Fig. 2 and effectually close the passage leading to the filler and prevent the air from passing from the keg up through the pipes to the filler and foaming the beer. This movement of the valve is entirely automatic, and consequently it is not necessary for the attendant to watch a keg and shut off the air when it is emptied. These filling attachments are usually arranged in series, one attendant having charge of three or more sets, wherein nine kegs can be emptied at the same time. The observing-glasses will always show when the kegs are empty, and it is not, therefore, necessary for the attendant after putting a bung in a keg and letting the air out of the glass to pay any further attention to it, as the valved trap will automatically shut off the air-pressure from the filler the instant the keg is emptied. Before removing the bung from a keg the attendant closes a valve 24 to prevent the escape of beer from the filler-reservoir and the other kegs and also closes a valve 15 to prevent the escape of air from the tank. As soon as the bung is inserted into a fresh keg the valves 15 and 24 are opened and the operation of emptying repeated. Whenever desired the operator may shut off the air from all the kegs of the set by means of the valve 10.

This apparatus is preferably arranged within an ice-box so that the beer will be reduced in temperature and delivered to the filler with all its natural effervesence and flavor preserved. An attendant can easily care for a number of the devices that are simultaneously emptying a number of kegs, and as the discharge-pipe leading to the filler is automatically closed in each instance the moment a keg is empty the constant presence of the attendant is not required in the ice-box nor watchfulness on his part to ascertain when a keg is empty, except to substitute a filled keg for an empty one and keep the filler supplied with the proper amount of beer.

We have referred to the use of the device in connection with an open siphonic filler; but it will be understood that the attachment may be used with any other style, if desired.

While we have shown and described the preferred manner of connecting up the air-tank and bungs with the filler, we do not wish to be confined to this method, as the connecting means is susceptible of numerous modifications; nor do we wish to be confined to the particular construction of the valved trap, as its details may be varied considerably, the essential feature of the invention being the introduction of closing means into the filler-passage to automatically shut off the air the instant the keg becomes empty.

Having thus described our invention, we claim as new and desire to secure by Letters Patent—

An attachment for bottle-fillers for effervescent liquids, comprising an air-supply tank, an air-supply pipe connected with said tank and having a plurality of branch pipes, bungs connected with said branch pipes and adapted to be fitted into a corresponding number of kegs, liquid-supply pipes connected with said bungs and having hand-valves, automatic valves provided in said liquid-supply pipes and arranged to close and shut off the passage of air therethrough as fast as the liquid is exhausted from the kegs with which said pipes are respectively connected, a filler-reservoir pipe 21 having independent connections with said supply-pipes, a sight-glass provided on said reservoir-pipe and having a suitable blow-off valve and a liquid-discharge pipe 26 leading from said reservoir-pipe to the filler, substantially as described and for the purpose specified.

In witness whereof we have hereunto set our hands this 28th day of November, 1900.

ARMIN L. NEUBERT.
 SIEGMUND T. WIEDENBECK.

In presence of—
 RICHARD PAUL,
 M. C. NOONAN.